2,102,946

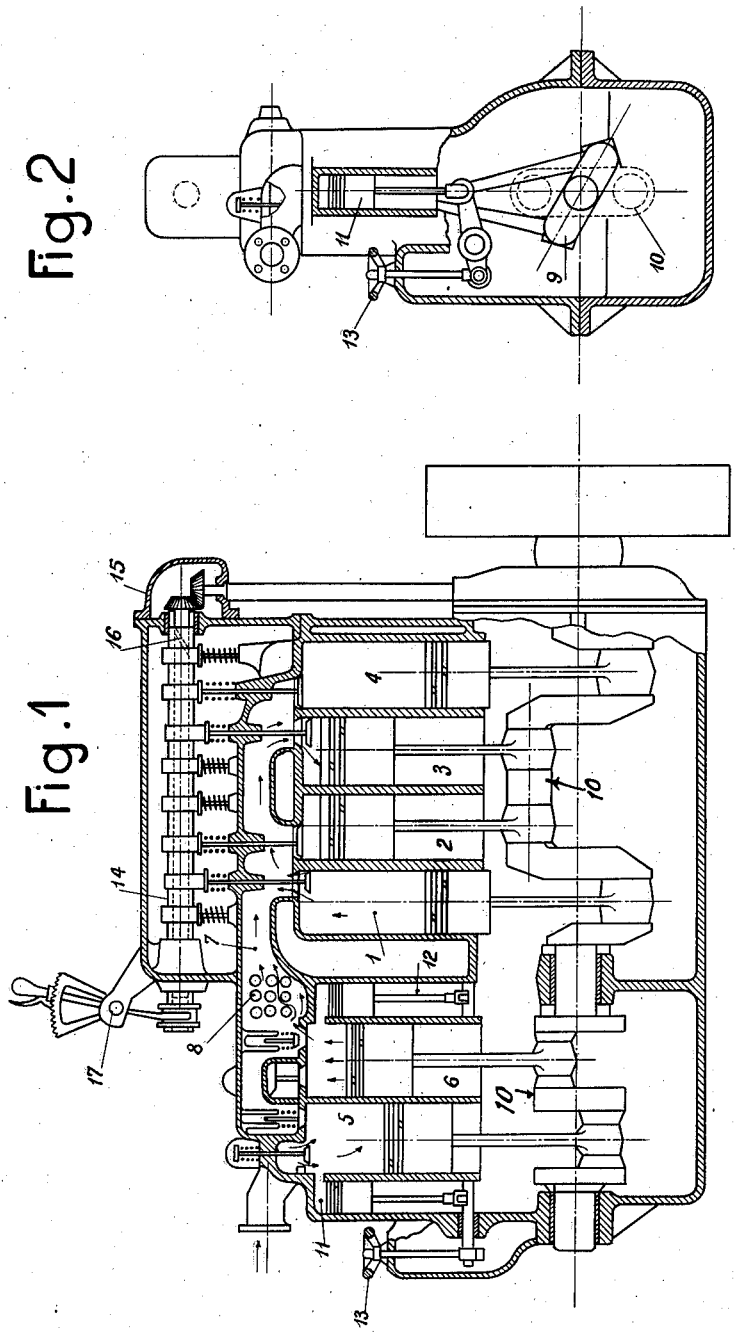
Dec. 21, 1937. P. DUGELAY 2,102,946
INTERNAL COMBUSTION ENGINE
Filed Nov. 10, 1933
PAUL DUGELAY
INVENTOR Patented Dec. 21, 1937

UNITED STATES PATENT OFFICE 2,102,946

INTERNAL COMBUSTION ENGINE

Paul Dugelay, Paris, France, assignor to Societe d'Exploitation de Brevets pour l'Industrie, l'Aviation et l'Automobile (Sebia), Paris, France, a corporation of France Application November 10, 1933, Serial No. 697,402
In France November 17, 1932

4 Claims. (Cl. 123—119)

The present invention relates to internal combustion engines and constitutes an improvement or modification of the engine described in my co-pending patent application Serial No. 528,754, which matured into Patent No. 1,971,176 granted August 21, 1934.

An engine in accordance with the said co-pending application is of the four stroke cycle type and comprises a plurality of working cylinders provided with inlet and exhaust valves and pistons. The engine is supplied with a gaseous charge from a compressor having a number of compression chambers equal to one-half the number of working cylinders of the engine. This charge is delivered into an intake manifold common to all the cylinders of the engine.

According to the co-pending application, the inlet valve of each cylinder of the engine is kept open beyond the period of the usual cycle that is to say considerably after the lower dead centre of the piston of the corresponding cylinder in such manner as to permit a partial transfer of the charge from this cylinder to the cylinder following in the cycle, the common manifold being more or less cooled according to the desired operating conditions. There is thus obtained by the combination of a preliminary compression by the compressor with intercommunication between the cylinders through the intake manifold, a cycle of operation which I term the "Sebia cycle", which is different from the usual Beau de Rochas cycle.

This new cycle lends itself to various applications according to the manners of regulation which it makes possible. Thus it has been proposed so to effect the adjustment or timing of the compressor that it only commences to deliver into the intake manifold after the closing of the valve which has been maintained open later than is otherwise customary that is to say after the transfer of part of the charge from one cylinder to another has been completed.

But it is also possible according to the present invention so as to adjust the timing of the compressor that it commences to deliver into the intake manifold during the transfer phase itself. According to this arrangement the capacity of the manifold is increased by that of the cylinders taking part in the transition phase and the pulsations in the manifold produced by the compressor are damped or reduced in effect by the capacity effect afforded by the sum of the volumes of the cylinders in which transition is occurring and of the volume of the manifold.

This arrangement may be useful in certain particular cases to satisfy certain constructional contingencies, while ensuring to the largest possible extent the benefit of the main invention.

On the other hand another arrangement included in the co-pending application consists in the provision of an operative connection between the control for the variation of the compressor output, and that of the closing of the inlet valves of the engine cylinder in such a manner that the two successive stages of compression in the compressor and in the engine remain substantially equal.

This is provided as being the most favorable regulation for obtaining the better compression efficiency. In practice according to the working conditions imposed it may be possible without departing from the spirit of the invention to distribute the compression between the two stages with considerable differences between the ratio of primary and secondary compression, either permanently by construction or in an adjustable manner by means of a control device, and the device of this character may act either on the timing of the compressor or on the rate of compression by reduction of the dead space or clearance of the compressor by any suitable adjustable system or by alteration in the timing of the moment of closing of the inlet valve of the engine cylinder.

Summarizing it is possible to utilize two means of regulation either separately or conjointly;

(a) variation of output of the compressor, (b) variation in the timing adjustment of the transfer phase.

The complete double stage compression effected according to the "Sebia cycle" comprises, in fact: A first stage in a cylinder with cold surfaces, a cooling in a manifold of the gases from the engine cylinder, and on those of the compressor and a second stage in a cylinder of the engine of which the surfaces are hot. The exponents K from the thermodynamic equation $pv^k$=const. ($p$ designating the pressure and $v$ the volume) for the two compression stages are therefore different and in determining the regulation of the pressure stages the possibility must be considered of effecting, with a final temperature favorable for working, an economic compression for a ratio of compression determined in the first place approximately. In practice, the index K of the engine cylinder varying with the charge, the second stage compression rate varies by this factor.

Thus according to the present invention:

1.—In aero-engines, operating at high altitudes, the variation of the compressor output may be effected by a variation in volume of the dead spaces or clearances of the compressor controlled either by hand or automatically in accordance with the altitude.

In these engines the modification of the compression of the second phase may be effected by timing the cam of the inlet valve of the engine cylinder after having effected the reduction in volume of the compression space of the compressor space in order to increase the degree of the final compression at high altitudes.

This regulation is therefore independent, in certain circumstances of the regulation of the output of the compressor.

2.—In Diesel type engines it may also be advantageous to vary the position of the inlet valve cam of the engine cylinder independently of the variation of output.

An example of carrying the invention into effect is shown on the annexed drawing in which Fig. 1 shows a longitudinal section and Fig. 2 a cross-section of a four stroke cycle internal combustion engine constructed in accordance with the invention.

In Fig. 1 an engine with four cylinders 1, 2, 3, 4, and a two cylinder compressor 5, 6 is shown. At the moment in the cycle of operation shown in the drawing, transfer of gas is being effected between the cylinders 1 and 3 the inlet valves of which are kept open simultaneously. At the same time, the compressor cylinder 6 is delivering its charge into the intake manifold 7 cooled by refrigerating tubes 8. This condition of the compressor and engine is obtained by suitable relative adjustment as shown on Fig. 2 between the connecting rods of the compressor the crankshaft of which is indicated at 9 and the connecting rods of the engine, the crankshaft of which is shown at 10.

Two small auxiliary cylinders 11 and 12 and pistons therein are provided to vary the dead space or clearance of the respective compressor cylinders 5 and 6. To this end the pistons of the cylinders 11 and 12 are adjustable axially in their cylinders by hand by means of the screw device 13. The control cams of the inlet valves of the engine cylinders are arranged on a hollow sleeve 14 adapted to slide on a control shaft 15 and arranged in coupling engagement with the said shaft through the medium of a helicoidally inclined sliding keyway 16. When the sleeve 14 is caused to slide axially on the shaft 15 by means of a control device 17, the angular adjustment of the sleeve and cam relatively to the shaft 15 changes due to the helicoidally inclined keyway and the moment of closing of the inlet valve of the cylinder which determines the period of transfer is regulated in this manner.

What I claim and desire to secure by Letters Patent of the United States is:—

1. In an internal combustion engine of the four stroke cycle type comprising an even plurality of working cylinders provided with pistons operating therein and inlet and exhaust valves and an intake manifold common to all the cylinders, in combination a piston compressor having a number of compression chambers equal to half the number of the working cylinders and an inlet and exhaust valve for each chamber, said compressor being arranged to deliver into said manifold, and the pistons thereof having connecting rods which are dephased with respect to the connecting rods of the pistons of the working cylinders of the engine, means for transferring a part of the gaseous charge from one working cylinder to another in a cyclic order through the respective inlet valves of the cylinders and through the manifold during a substantial portion of an induction stroke of the piston of each of the respective working cylinders, in order to cause said compressor to deliver its charge into the intake manifold at regular delivering intervals, each of which commences during, and is partly simultaneous with, the period of transfer into a predetermined working cylinder and terminates after the termination of the said transfer period.

2. In an internal combustion engine of the four stroke cycle type comprising an even plurality of working cylinders provided with pistons operating therein and inlet and exhaust valves and an intake manifold common to all the cylinders, in combination, a compressor having a number of compression chambers equal to half the number of the working cylinders, and an inlet and exhaust valve for each chamber, said compressor being arranged to deliver into said manifold, means for transferring a part of the gaseous charge from one working cylinder to another in a cyclic order through the respective inlet valves of the cylinders and through the manifold during a substantial portion of an induction stroke of the piston of each of the respective working cylinders, means for so regulating the relation between the strokes of the working cylinder pistons during the transfer phase and variations of pressure in the compressor and the times of opening the valves of the said compressor that the compressor delivers its charge into the intake manifold at regular delivery intervals, each interval commencing during, and being partly simultaneous with, the transfer period into a predetermined working cylinder and terminating after the termination of the said transfer period, and means operable to vary the dead space of the compressor and thereby vary the beginning of the delivery intervals.

3. In an internal combustion engine of the four stroke cycle type comprising an even plurality of working cylinders provided with pistons operating therein and inlet and exhaust valves and an intake manifold common to all the cylinders, in combination, a compressor having a number of compression chambers equal to half the number of the working cylinders and an inlet and exhaust valve for each chamber, said compressor being arranged to deliver into said manifold, means for transferring a part of the gaseous charge from one working cylinder to another in a cyclic order through the respective inlet valves of the cylinders and through the manifold during a substantial portion of an induction stroke of the piston of each of the respective working cylinders, and means for so regulating the relation between the strokes of the pistons of the working cylinders during the transfer phase and variations of pressure in the compressor and the times of opening the valves of the said compressor that the compressor delivers its charge into the intake manifold at regular delivery intervals, and each of said delivery intervals commences during and is partly simultaneous with the period of transfer into the working cylinder which receives a charge during said transfer period and terminates after the termination of the said transfer period.

4. An engine according to claim 3, wherein the compressor, for regulating the timing and the output thereof and for regulating the timing of the inlet valves of the working cylinders of the engine, is so calculated and arranged that the ratio of compression between the compressor and the engine cylinder are essentially unequal.

PAUL DUGELAY.